United States Patent [19]
Wilson et al.

[11] 4,117,331
[45] Sep. 26, 1978

[54] IMAGE TRANSLATION DEVICES

[75] Inventors: William George Moore Wilson, Blackwater; Douglas Edward Stewart, Frimley Green, both of England

[73] Assignee: The Marconi Company Limited, Chelmsford, England

[21] Appl. No.: 792,742

[22] Filed: May 2, 1977

[30] Foreign Application Priority Data

May 5, 1976 [GB] United Kingdom ............ 18414/76

[51] Int. Cl.$^2$ ............................................. H01J 31/49
[52] U.S. Cl. ................................... 250/334; 250/347
[58] Field of Search ............... 250/334, 330, 347; 350/6, 7, 299; 358/206

[56] References Cited

U.S. PATENT DOCUMENTS

| 2,070,460 | 2/1937 | Traub | 350/6 UX |
| 3,287,559 | 11/1966 | Barnes | 250/334 X |
| 3,941,923 | 3/1976 | Wheeler | 250/334 X |

Primary Examiner—Davis L. Willis
Attorney, Agent, or Firm—Kirschstein, Kirschstein, Ottinger & Cobrin

[57] ABSTRACT

A portable device providing visual images of infra-red sources by means of I.R. detectors/electric signals/light emitting diodes. Scanning is employed to reduce the numbers of I.R. detector elements and L.E.D.'s, the scanning being effected by a rotating polygon having mirror facets tilted at slightly different angles to scan the object and image fields simultaneously in strips which cover the respective fields in a cycle.

One aspect of the invention consists in tilting the I.R. and visual facets oppositely to transfer a low I.R. strip position to a correspondingly high visual strip position and vice versa.

A second aspect consists in using a polygon with 45° facets and I.R. detectors and L.E.D.'s on optical paths parallel to the axis of rotation. The scanned strips are then symmetrical about their field center lines.

12 Claims, 5 Drawing Figures

IMAGE TRANSLATION DEVICES

This invention relates to image translation devices and is particularly, although not exclusively, concerned with such devices for translating an infra-red image while converting it into a visual image; the invention, however, is clearly applicable to the translation of an image from any location to another location, the image at the one location being of any one "light" frequency and the image at the other location being of the same or any other "light" frequency.

It is a problem with infra-red image translating devices, in particular to provide a highly discriminating device which is, at the same time, light in weight and small in dimensions so as to be conveniently portable. It is, in general, necessary for such devices to have an optical system which focuses an infra-red (I.R.) image of the scene onto an object field. An inversion, both lateral and vertical, of the I.R. image through the optical system will occur and it is therefore necessary to produce a further inversion, before the visual image is displayed. This could, of course, be done optically but, where weight, size and efficiency are at a premium the use of a lens or mirror purely for inversion is to be avoided.

According to one aspect of the present invention, therefore, in an image translation device, a path from an object field to an image field includes an opto-electrical transducer arranged to scan the object field by means of a succession of facets of a rotatable, substantially regular, polygon, which facets are differently angled with respect to the axis of rotation so that each facet scans a respective strip of the object field, an electro-optical transducer arranged to scan the imaged field by means of a succession of facets of a rotatable, substantially regular, polygon, which facets are differently angled with respect to the axis of rotation so that each facet scans a respective strip of the image field, the two transducers being coupled together electrically and the arrangement being such that the two facets which respectively scan the object field and the image field at any instant have complementary angles such that there is an image inversion between the object field and the image field.

The facets are preferably the facets of a single polygon, there being one complete set of facets or one or more pairs of complete sets in succession around the polygon, a set providing a complete field scan, the two transducers having optical axes which intercept the polygon periphery in the above two facets respectively.

The optical path from the centre of the object field to the polygon may be in line with the corresponding optical path from the polygon to the centre of the image field. Alternatively, these two optical paths may be parallel but offset.

Where there are two or more sets of facets, for each set the magnitude of the facet angle with respect to the axis of rotation may vary continuously between a maximum and a minimum, corresponding facets in successive sets being of complementary angle with respect to the axis of rotation. Alternatively, for each set of facets, the angle of the facets may vary continuously between complementary maximum values, the direction of the variation alternating in successive sets.

According to a further alternative, in which there may be only one set of facets around the polygon periphery, each set of facets may comprise two half-sets in sequence of which corresponding facets in successive half-sets are of complementary angle with respect to the axis of rotation. In this case, each half set may consist of facets having a sequence of angle values which alternate with those in the next half set.

In an alternative arrangement according to the invention, the facets are the facets of two identical polygons arranged to rotate in unison and to scan the object field and the image field respectively.

In a further alternative, the polygon is hollow, with walls having internal and external facets inherently complementary and arranged to scan the two fields respectively.

The transducers in the above arrangement may each comprise a line of transducer elements of length and disposition corresponding to the transverse dimension of each said strip, the elements of the two transducers being electrically coupled in an inverse relation so as to invert each said strip of the image field with respect to its corresponding strip in the object field.

A further problem that arises in scanning arrangements according to the invention is the possibility of distortion of the scanned field such as to cause small areas of overlap or small gaps between the scanned strips of the field.

According to a second aspect of the invention therefore, an image translation device includes a linear array of optical detectors, a rotatable substantially regular polygon having a plurality of facets which are differently angled with respect to the axis of rotation so that on rotation of the polygon each facet exposes the detector array to a respective strip of the object field, the width of the strip corresponding to the length of the array and the number and angles of the facets being such as to scan substantially the whole of the object field, and wherein the optical path between the polygon and the detector array is incident upon the polygon facets at an angle which for each facet is independent of the rotation of the polygon, the arrangement being such that the scanned strips are substantially parallel.

The average value of the inclination of the facets to the axis of rotation of the polygon is preferably 45°.

One embodiment of an image translation device in accordance with the first aspect of the invention, and a modification thereof in accordance with the second aspect, will now be described, by way of example, with reference to the accompanying drawings, of which:

Figure 1:
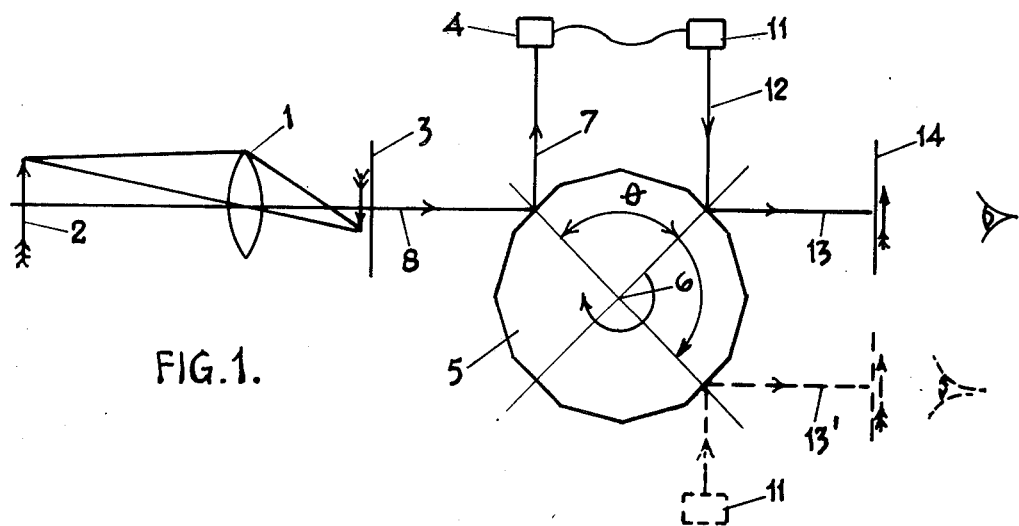
FIG. 1 is a diagrammatic plan view of the whole device.

Referring to the drawings, FIG. 1 shows, in very basic outline, the essentials of the device which is required to produce a visible image of a scene from which only infra-red radiation may be emitted. An optical system represented by a lens 1 focusses an image of the infra-red source, represented by an arrow 2, on a screen 3. This image is inverted laterally (as shown), and vertically, and must be re-inverted for final viewing.

The conversion of the infra-red image to a visible image is effected by an infra-red sensitive detector exposed to the I.R. image and producing a corresponding electric signal. This opto-electric transducer is then electrically coupled to an electro-optic transducer constituted by light-emitting diodes which operate in the visible light range.

The I.R. detector elements are extremely small, and to cover an image of any appreciable size would require such a number of them that with present technology the device would become uneconomic, quite apart from the difficulty of making connections to a large bank of detector elements when each may be only 0.002 inches square. They also have to be cooled to a very low temperature to give optimum performance.

In the present device therefore, a single line of I.R. detectors 4 is employed, of which an end view would be seen in FIG. 1. The line of detector elements 4 is substantially shorter, even with say, 200 elements, than the complete height of the I.R. image on the screen 3. It is therefore necessary to scan the screen 3, i.e. the object field, in a number of strips or bands to cover the complete scene.

Side to side coverage of the field is achieved by sweeping it with a mirror surface. Continuous coverage of the field is obtained by using the facets of a polygon 5 as the mirror surfaces, the polygon being rotated at a constant speed about an axis 6 through its centre. The line of detectors 4 is restricted to receiving I.R. radiation along an optical axis 7 by focussing means not shown. As the facets rotate about the axis 6, therefore, the angle of the facet, with respect to the axis 7, changes and the effective scanning beam 8 sweeps across the field 3 at twice the angular velocity of the facet.

Figure 2:
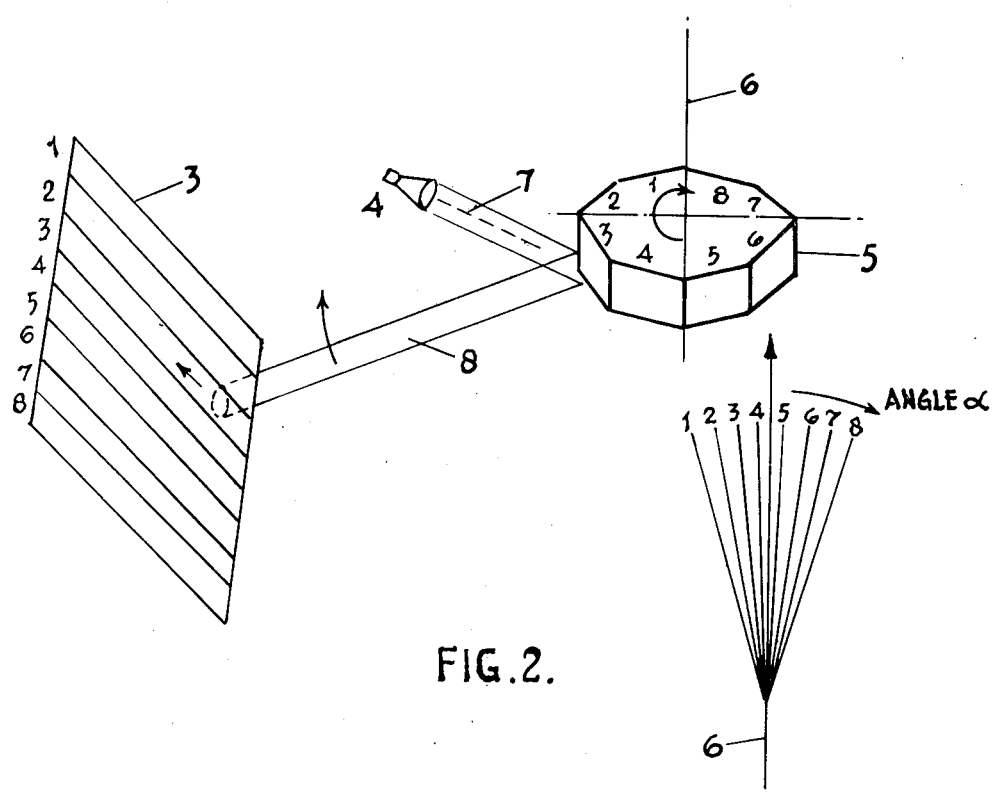
FIG. 2 is a diagrammatic perspective view of a facetted polygon scanning an object field.

Turning to FIG. 2, this illustrates how the vertical sweep is effected. (The number of facets of the polygon shown in this FIG. has been reduced from the number shown in FIG. 1 for convenience and simplicity). Each facet is tilted slightly with respect to the axis 6, that is, out of a plane parallel to the axis 6, so that the scanning beam is tilted up or down accordingly. In the very basic arrangement of FIG. 2 the facet angles vary sequentially from a downward maximum to an upward maximum as indicated by the associated angular relationship diagram. The numbered facets then scan the field in strips or bands as indicated by the strip numbering.

Reverting now to FIG. 1, the line of detectors 4 is coupled on a one-to-one basis to a similarly disposed line of light-emitting diodes 11 from which there is also a fixed light transmission path 12 back to the polygon 5. The paths 7 and 12 are directed to similar positions on respective facets so that as one facet scans the object field 3, the other facet sweeps the beam of light 13 across an image field 14 which is viewed by the operator. Since all of the facets are angled to varying degrees, with respect to the rotational axis 6, the image field 14 is also scanned in a vertical direction by the successive facets.

So far, no regard has been paid to the question of the relative positions and orientation of a particular strip of image in the object field and the image field. It is required, however, that the original scene 2, and the visible image shall have the same orientation. Since the optical system 1 essentially introduces one inversion, it is required that the scanning system shall introduce a further inversion. Each strip of the scanned field 3 can clearly be inverted by inverting the connections between the two transducers 4 and 11. However, it is still necessary to invert the strips so that, for example, the top strip of the field 3 becomes the bottom strip of the field 14.

This is achieved by arranging that the 'I.R. facet' has the complementary angle to that of the 'visible facet', which then compels the use of an even number of facets in the polygon. There are various ways of achieving this, some of which are illustrated by the facet angle patterns of FIG. 3. In the illustrated arrangements it is assumed that eight strips are sufficient to cover the field, i.e. that eight different facet angles are provided in a 16 facet polygon.

The zero line in the different angle patterns represents zero 'tilt' i.e. a facet parallel to the rotational axis. The facet angles are in steps of, say, 1°, giving a total variation of 7°. Pattern A shows the simplest arrangement, like that of FIG. 2, in which the facet angles vary continuously from one extreme to the other. It will be seen, however, that in this pattern there is no fixed spacing between two facets for which the facet angles are equal in magnitude and opposite in direction, i.e. complementary, as the polygon rotates. There is therefore no fixed position of the paths 7 and 12 in FIG. 1 which will always invert the strip position. Pattern A is therefore impracticable.

Patterns B and E also show an arrangement in which the set of facet angles is repeated identically around the periphery but in this case it may be seen that a 90° spacing of the operative facets, e.g. between facets 1 and 5 or 2 and 6, etc. does make the operative facets complementary. Where a single set of facets occupy the whole periphery the complementary facets will, of course, occur at 180° spacing. These alternative arrangements are illustrated in FIG. 1.

Patterns C and D provide a complementary facet angle at a facet spacing of 180° although in these two cases the two sets of facets around the polygon are not identical. In pattern C the magnitude of the facet angle varies continuously between a maximum at the beginning and a minimum at the end, the sets of facets being wholly inverted one from the other.

In pattern D the facet angle varies continuously between complementary maximum values, i.e. between −3.5° and +3.5°. Pattern E shows an optimum arrangement where a complementary facet occurs at 90° (or 180° for a single set per revolution) and has a maximum step angle between adjacent facets of two steps for any number of facets on the polygon. It may be seen that this pattern may be considered as consisting of half sets each half set commencing at one extreme angle value and extending in a sequence of alternate angle values towards the other extreme value.

Apart from pattern A which provides no continuous complementary facet relation, the remaining patterns have different merits. Patterns B and E, comprising two identical sets of facets, could be built into an eight-facet polygon rotating at twice the speed of the 16-sided polygon. Patterns C and D require 16-facet polygons.

The magnitude of the largest facet angle step between adjacent facets is of importance in connection with the avoidance of interaction between them. From this point of view pattern D is best since the step is uniform at the minimum value. Pattern C is worst, the step between facets 1 and 2 being the maximum, 7°, while pattern B has a value equivalent to half the number of facets in a set (4°). Pattern E has a maximum step value equivalent to two facets, i.e. 2°, irrespective of the number of facets in a set. Whereas pattern B is satisfactory when the number of facets in each set is small, pattern E can be optimally used for all cases.

A further factor in considering the merits of the different facet angle patterns is the regularity with which any particular strip of field is scanned. Clearly, at constant rotation of the polygon the cycle rate is constant, but within a cycle, the scan rate may not be. Thus, in patterns B and E, since the two sets within a cycle are identical, the scan rate is constant for every facet angle (and thus for every scanned strip). In pattern D however, the scan rate varies widely. Thus, facets 8 and 9 occur twice in immediate succession and then not again for fifteen facets. There is therefore a variation of 15:1 in this scan rate which effectively reduces the rate from twice per revolution to once per revolution. The polygon rotational speed would therefore, have to have a higher minimum value to avoid image flicker. It may be noted that in the particular case of pattern D the variation of scanning rate increases with the magnitude of the facet angle.

Pattern C has a constant variation of scanning rate for all numbers of facets, this being at a low rate of 9:7.

A third factor in weighing the merits of the different patterns is the ability to permit the visible centre line of sight 13 to lie in line with, or at least parallel to, the object field centre-line of sight 8. This is an important factor in a portable device which can do duty as a sight for photography or weapon aiming. It may be seen from FIG. 1 that, assuming the detectors 4 and LED's 11 can take any position not in their respective fields, any spacing of the operative pair of facets can be accommodated to provide parallel beams 8 and 13. It is more conveniently achieved when the angle between the complementary facets is either 90° or 180°, which allows 90° to be used between the beams 7 and 8 and also between the beams 12 and 13. The use of parallel but offset lines of sight 8 and 13', the latter shown in broken lines, enables the complementary facets to be positioned at 180°.

It is necessary, if distortion of the final image is to be avoided, for the angle between the beams 8 and 7 and the angle between the beams 13 and 12 to be equal. Where the operative facets are 90° apart, as shown in full lines in FIG. 1, it follows therefore that these angles must both be 90° if the input and output paths are to remain in line. In general, where the lines of sight 8 and 13 are wholly in line in this way, the two angles in question must in fact be $(180° - \theta)$ where $\theta$ is the angular displacement between the operative facets. Where $\theta$ is 180°, this permits the special case shown in broken lines and the angle between beams 7 and 8 and between beams 12 and 13 can be any convenient angle (although still equal).

Figure 3:
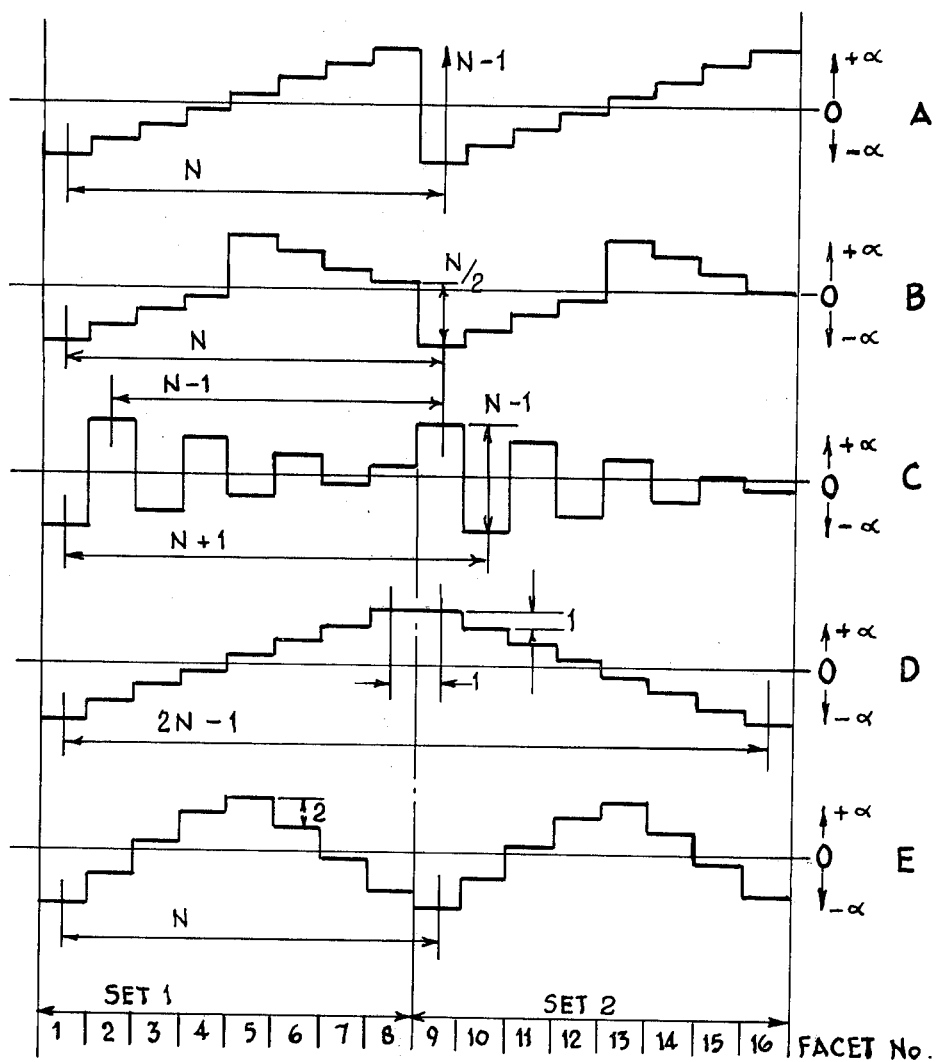
FIG. 3 is a chart illustrating a number of different facet-angle patterns for the polygon.

It follows therefore that all patterns except A shown in FIG. 3 are suitable for one or other of the arrangements in FIG. 1. Patterns C and D being only suitable for the 180° position whilst patterns B and E are suitable for both arrangements. Patterns C and D could of course be made suitable for the 90° position if four sets of facets are used but this will have the disadvantage of a large polygon, likewise any value of $\theta$ can be accommodated providing that the appropriate number of sets for a given pattern is practical.

It may be seen then that the device described provides a method of re-inverting the image without any additional elements, merely by arrangement and disposition of those provided for other purposes. Both lateral and vertical inversion are therefore provided within the scanning system, the first merely by virtue of viewing the rotation of the polygon from opposite sides and the second by judicious angling of the polygon facets. The advantage of a single polygon for scanning the object field and the image field is, at the same time, retained.

The use of object and image screens 3 and 14 has been described for simplicity of explanation but it may be noted that these are not essential. The object field may be the field as seen by the operative I.R. facet directly through the I.R. optical system 1. Similarly, the screen 14 may be replaced by a further optical system. It may appear that this would be contrary to the requirement for presenting an upright image but it should be noted that use of the screen 14, itself does produce an inversion as compared with viewing the image as presented by the 'visible' facet directly. That is, with a screen 14 the eye sees only the final projected position of the image, it cannot tell the direction from which this image was projected. The top of the screen image, for example, is produced by an upward projection, which, seen by the eye directly, would seem to be coming from the bottom of an object.

In accordance with this interpretation, the arrangement of FIG. 1 can be seen as providing one inversion by the optical system 1, one inversion, as explained above, by the screen 14 or its optical substitute and no inversion by the polygon itself. The polygon can be considered as providing no inversion in the following way: if, say, the input beam 8 comes from the lowest scanned strip, the output beam 13 will be directed at the uppermost strip in the image field in accordance with the invention. That is to say, the optical path from object field to image field has not changed its direction in passing through the optical axis, i.e. a beam that starts in an upward direction toward the polygon is seen to arrive in an upward direction after 'passing through' the polygon.

Where the concept of image inversion is used elsewhere in this specification this interpretation should be borne in mind.

In a modification of the arrangement described, the polygon is hollow, the facet walls having double sided mirror surfaces. The same facet can then be used for scanning both fields, one externally and one internally, the surfaces being inherently complementary.

In a further modification two identical polygons are used, mounted on the same shaft and driven in unison. They are however 'out of phase' by any convenient amount to accord with the 'straight through' line of sight requirement and the desired positions of the detectors and LED's.

An image translation device modified from that described above and in accordance with the second aspect of the invention will now be described, by way of example, with reference to FIGS. 4 and 5 in addition.

The interlacing of the scanned strips of field in the above described arrangement is inherently imperfect for two reasons. First, it may be shown that the scan path of each strip in the field is decreasingly parallel to the horizontal plane as the facet angle, i.e. the elevation, varies from zero. Since the range of incident rays 8 is not symmetrical about the fixed reflected ray 7, the resulting field, as projected onto the internal surface of a sphere centred on the reflecting facet, is of wedge shape varying in height from side to side. If the width and position of the various strip scans is correctly set for a particular orientation of successive facets, it follows that there will be either gaps or overlaps between the strips at other positions along the strips.

A second reason for distortion in the strip interlacing is the use of a moving reflector surface (the facet) to steer (in effect) the fixed detector ray 7 across the field 3. Since the ray 7 has some width, at least in the direction normal to the plane of the drawing (FIG. 1), it will be rotated about its path axis on reflection from the facet. (It is appreciated that the ray 7 is in fact the reflected ray and that the facet selects different incident rays 8 for reflection along path 7, but it is convenient and clearer to consider the ray 8 as the reflected and 'steered' version of the ray 7). This rotation increases from zero at zero elevation (i.e. zero facet angle). The result is that the width of each strip of the field varies along its length and produces either gaps or overlaps between them.

This latter cause of error is inherent in any scanning arrangement using mirror surfaces to steer a scanning beam and can only be avoided by further optical measures to re-orientate the beam.

Figure 4:
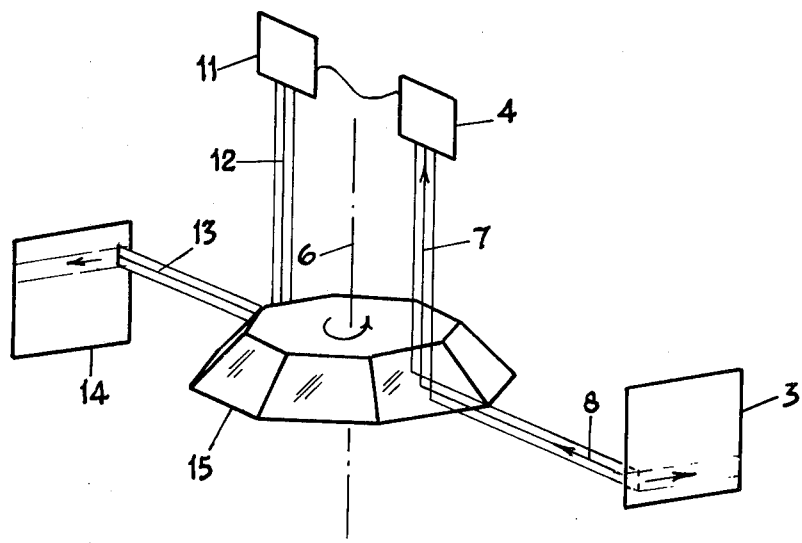
FIG. 4 is a perspective view of a modification of the image translation device.

The lack of parallelism between the strips of the field can however be overcome by the modification illustrated in FIG. 4 of the drawings.

In this arrangement (again an eight-facet polygon 15 is shown for simplicity) the facets are basically angled at 45° to the axis of rotation and are then tilted back and forward from this position in accordance with optimum conditions derived from consideration of the patterns shown in FIG. 3. The detector array 4 is in this case positioned out of the plane of the polygon in a position such as to receive a collimated beam in a path 7 which is parallel to the axis of rotation 6. The optical path 7 is thus incident upon the polygon facet at an angle which, within the operative span of each facet, is independent of the rotation of the polygon. The detector array lies on a radius from the axis of rotation so that the beam 8 scans the field in a broadside manner as the polygon rotates.

Figure 5:
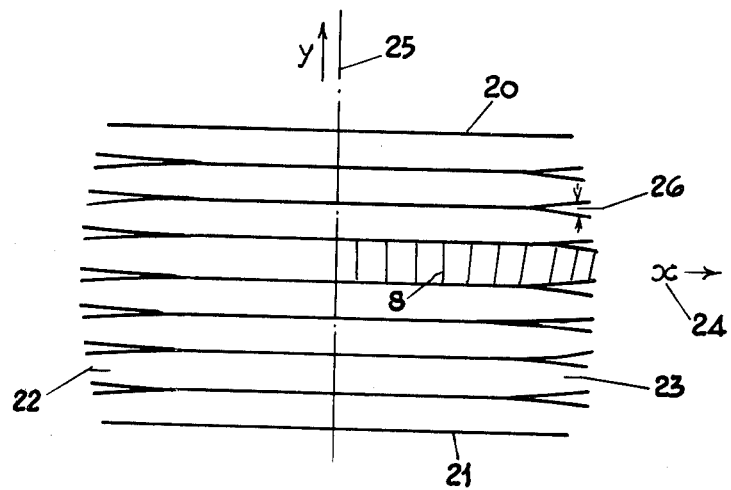
FIG. 5 is a diagram of the object field as seen by the modified arrangement of FIG. 4.

The resulting field is shown in FIG. 5. As projected on the internal surface of a sphere (to discount apparent distortion arising from different path lengths to a flat field) the field can be shown to be equivalent to a portion of the globe surface between two lines of latitude 20 and 21, equally above and below the equator 24, and two lines of longitude, 22 and 23, equally spaced either side of the centre plane 25. The strips of the field are then parallel to each other, and no gaps or overlaps occur from this cause.

It is not, however, possible to remove the second cause of error without undue complexity, as explained above, and the field does therefore have gaps 26 between the ends of adjacent strips. The scanning beam 8 is shown in section in sequential positions and it can be seen that it is rotated to an increasing extent towards the ends of each strip. The strip width is therefore effectively reduced at the ends.

The maximum width of the gap can be shown to be $h(1 - \cos x)$, where $h$ is the width of the beam, i.e. the length of the detector array, and $x$ is the maximum angular extent of the strip off centre. A typical value of $x$ would not exceed about 20° and even for that value the gap is only $0.06h$. This construction does therefore provide a very satisfactory field scan.

It will be clear that this aspect of the invention is not concerned with the inversion of the image and it is not therefore restricted to use with LED-produced visual images as shown in FIG. 4. The detectors 4 may be coupled to a television type display instead of the LED array 11, in which case there is no requirement to provide particular strip orientation or to align line of sight directions.

Where a visual image is produced by LED devices as in the arrangement of FIG. 4, it is desirable that the LED array be arranged diametrically opposite the detector array as shown so as also to provide a beam on a path 12 parallel to the rotation axis. The two lines of sight, from object field and image field will then be directly in line and the field shown in FIG. 5 will be symmetrical about the axis 25 as shown. The complementary facets are therefore positioned 180° apart, whether they occur in the same or successive facet sets.

The optical detector array 4 referred to above, has been described as a single line of elements. In order to increase the magnitude of signal derived by this transducer, a rectangular array of elements may be employed so that each column of the array receives the same signal but slightly delayed, as the polygon scans the I.R. field. Delay elements are then introduced in the outputs of the various columns, decreasing in magnitude from the first to the last so that the delayed outputs are coincident and can be added directly. The signal strength is thus effectively increased by the number of columns in the array.

We claim:

1. An image translation device comprising an object field, a rotatable substantially regular polygon having peripheral facets differently angled with respect to the axis of rotation of said polygon for scanning said object field in strips, an opto-electrical transducer for receiving optical signals reflected by said facets and converting them into electrical signals, an image field, a rotatable substantially regular polygon having peripheral facets differently angled with respect to its axis of rotation for scanning said image field in strips, an electro-optical trancsducer for receiving said electrical signals and coverting them into optical signals for reflection to said image field, the two transducers being coupled together electrically for the transmission of optical signals from said object field to said image field, and said facets being angled in such manner that the two facets respectively scanning the object field and the image field at any instant have complementary angles for effecting image inversion between the object field and the image field.

2. An image translation device according to claim 1 wherein scanning of said object field and said image field is effected by a single polygon.

3. An image translation device according to claim 2 wherein said single polygon has at least one pair of complete sets of said facets in succession around its periphery each of said sets providing a complete field scan and said transducers having optical axes which intercept the polygon periphery in said two facets respectively.

4. An image translation device according to claim 3 and comprising an optical path from the centre of said object field to said polygon and an optical path from said polygon to the centre of said image field, the two optical paths being in line.

5. An image translation device according to claim 3 wherein for each of said sets of facets, the magnitude of the facet angle with respect to the axis of rotation varies continuously between a maximum and a minimum, corresponding facets in successive sets being of complementary angle with respect to said axis of rotation.

6. An image translation device according to claim 3, wherein, for each of said sets of facets, the angle of the facets varies continuously between complementary maximum values, the direction of the variation alternating in successive sets.

7. An image translation device according to claim 3, wherein each of said sets of facets comprises two half-sets in sequence, of which corresponding facets in successive half-sets are of complementary angle with respect to said axis of rotation.

8. An image translation device according to claim 7, wherein each said half set consists of facets having a sequence of angle values which alternate with those in the next half set.

9. An image translation device according to claim 1, wherein said opto-electric transducer is responsive to infra-red radiation.

10. An image translation device according to claim 1, wherein said transducers each comprise a line of transducer elements of length and disposition corresponding to the transverse dimension of each said strip, said elements of the two transducers being electrically coupled in an inverse relation so as to invert each said strip of the image field with respect to its corresponding strip in the object field.

11. An image translation device comprising an object field, an image field, a rotatable substantially regular polygon having peripheral facts differently angled with respect to the axis of rotation of said polygon for scanning said object field and said image field in strips, an opto-electrical transducer for receiving optical signals reflected by said facets from said object field and converting them into electrical signals, an electro-optical transducer for receiving said electrical signals and converting them into optical signals for reflection by said facets to said image field, the two transducers being coupled together electrically for the transmission of optical signals from said object field to said image field, and wherein the optical paths between each said transducer and said polygon are incident upon each facet in turn at an angle which, for each facet, is independent of the rotation of the rotation of the polygon, to provide scanning of said object field and of said image field in substantially parallel strips.

12. An image translation device according to claim 11, wherein the average value of the inclination of said facets to said axis of rotation of said polygon is 45°.

* * * * *